(12) United States Patent
Chaudhuri et al.

(10) Patent No.: US 7,742,982 B2
(45) Date of Patent: Jun. 22, 2010

(54) SYSTEMS AND METHODS FOR DETERMINING THIN-FILE RECORDS AND DETERMINING THIN-FILE RISK LEVELS

(75) Inventors: Anamitra Chaudhuri, Belle Mead, NJ (US); Nancy A. Hadenfeldt, Lincoln, NE (US); Erik Hjermstad, Omaha, NE (US)

(73) Assignee: Experian Marketing Solutions, Inc., Schaumburg, IL (US)

( * ) Notice: Subject to any disclaimer, the term of this patent is extended or adjusted under 35 U.S.C. 154(b) by 21 days.

(21) Appl. No.: 11/871,572

(22) Filed: Oct. 12, 2007

(65) Prior Publication Data

US 2008/0255975 A1 Oct. 16, 2008

Related U.S. Application Data

(60) Provisional application No. 60/923,060, filed on Apr. 12, 2007.

(51) Int. Cl.
*G06Q 40/00* (2006.01)
(52) U.S. Cl. .......................................... 705/38; 705/39
(58) Field of Classification Search ................ 705/38, 705/36, 99
See application file for complete search history.

(56) References Cited

U.S. PATENT DOCUMENTS

| | | | |
|---|---|---|---|
| 5,583,763 | A | 12/1996 | Atcheson et al. |
| 5,802,142 | A | 9/1998 | Browne |
| 5,822,410 | A | 10/1998 | McCausland et al. |
| 6,119,103 | A | 9/2000 | Basch et al. |
| 6,202,053 | B1 | 3/2001 | Christiansen et al. |
| 6,430,539 | B1 | 8/2002 | Lazarus et al. |
| 6,640,215 | B1 | 10/2003 | Galperin et al. |

(Continued)

FOREIGN PATENT DOCUMENTS

JP 2003016261 1/2003

(Continued)

OTHER PUBLICATIONS

Sarah Burr, Ph.D., Asset Builders of America, Inc. and Virginia Carlson, Ph.D., University of Wisconsin-Milwaukee, Utility Payments as Alternative Credit Data: A Reality Check, Oct. 5, 2006.*

(Continued)

*Primary Examiner*—Hani M Kazimi
*Assistant Examiner*—Clifford Madamba
(74) *Attorney, Agent, or Firm*—Knobbe, Martens, Olson & Bear, LLP

(57) ABSTRACT

In some embodiments, systems and methods are disclosed for generating filters to determine whether a consumer is likely to have a scoreable credit record based on non-credit data, and to determine a potential risk level associated with an unscoreable credit record based on non-credit data. Existing scoreable and unscoreable records are compared to determine factors correlated with having an unscoreable record, and a multi-level filter is developed. Unscoreable records having at least one entry are compared to determine whether they are "good" or "bad" risks, factors correlated with either condition are determined, and a filter is developed. The filters can be applied to records comprising demographic data to determine consumers that are likely to have unscoreable records but represent good risks.

8 Claims, 7 Drawing Sheets

U.S. PATENT DOCUMENTS

| | | |
|---|---|---|
| 6,823,319 B1 | 11/2004 | Lynch et al. |
| 6,839,682 B1 | 1/2005 | Blume et al. |
| 7,120,599 B2 | 10/2006 | Keyes |
| 7,383,215 B1 | 6/2008 | Navarro et al. |
| 2001/0039523 A1 | 11/2001 | Iwamoto |
| 2001/0044766 A1 | 11/2001 | Keyes |
| 2002/0165839 A1 | 11/2002 | Taylor et al. |
| 2002/0198824 A1 | 12/2002 | Cook |
| 2003/0046223 A1 | 3/2003 | Crawford et al. |
| 2003/0065563 A1 | 4/2003 | Elliot et al. |
| 2003/0097329 A1 | 5/2003 | Nabe et al. |
| 2003/0195830 A1 | 10/2003 | Merkoulovitch et al. |
| 2003/0212618 A1 | 11/2003 | Keyes et al. |
| 2003/0217003 A1 | 11/2003 | Weinfalsh et al. |
| 2003/0236738 A1 | 12/2003 | Lange et al. |
| 2004/0006536 A1 | 1/2004 | Kawashima et al. |
| 2004/0030667 A1 | 2/2004 | Xu et al. |
| 2004/0044615 A1 | 3/2004 | Xue et al. |
| 2004/0044617 A1 | 3/2004 | Lu |
| 2004/0064402 A1 | 4/2004 | Dreyer et al. |
| 2004/0111358 A1 | 6/2004 | Lange et al. |
| 2004/0111363 A1 | 6/2004 | Trench et al. |
| 2004/0117358 A1 | 6/2004 | Von Kaenel et al. |
| 2004/0177030 A1 | 9/2004 | Shoham |
| 2004/0193535 A1 | 9/2004 | Barazesh |
| 2004/0199456 A1 | 10/2004 | Flint et al. |
| 2005/0027632 A1 | 2/2005 | Zeitoun et al. |
| 2005/0086579 A1 | 4/2005 | Leitner et al. |
| 2005/0102226 A1 | 5/2005 | Oppenheimer et al. |
| 2005/0125350 A1 | 6/2005 | Tidwell et al. |
| 2005/0130704 A1 | 6/2005 | McParland et al. |
| 2005/0154664 A1 | 7/2005 | Guy et al. |
| 2005/0278246 A1 | 12/2005 | Friedman et al. |
| 2005/0279824 A1 | 12/2005 | Anderson et al. |
| 2006/0059073 A1 | 3/2006 | Walzak |
| 2006/0129428 A1 | 6/2006 | Wennberg |
| 2006/0241923 A1 | 10/2006 | Xu et al. |
| 2006/0242049 A1 | 10/2006 | Haggerty et al. |
| 2006/0242051 A1 | 10/2006 | Haggerty et al. |
| 2006/0282359 A1 | 12/2006 | Nobili et al. |
| 2007/0061243 A1 | 3/2007 | Ramer et al. |
| 2007/0255645 A1* | 11/2007 | Morris et al. ............... 705/38 |
| 2007/0255646 A1 | 11/2007 | Morris et al. |
| 2007/0282736 A1 | 12/2007 | Conlin et al. |

FOREIGN PATENT DOCUMENTS

| | | |
|---|---|---|
| TW | 256569 | 6/2006 |
| WO | WO 2004/114160 | 12/2004 |
| WO | WO 2006/099492 | 9/2006 |
| WO | WO 2008/127288 | 10/2008 |

OTHER PUBLICATIONS

Sara Burr, Ph. D., Asset Builders of America, Inc. and Virginia Carlson, Ph. D., University of Wisconsin-Milwaukee, Utility Payments as Alternative Credit Data: A Reality Check, Oct. 5, 2006 ("AssetBuilders").*

How to Reach the Growing 'Thin File Market: Huge Immigrant Market and Other Groups with Little or No Credit History May Be Creditworthy. There are Several Ways to Tap This Well of Business. Josh Kessler, ABA Banking Journal, vol. 97, 2005, Abstract.*

The Benefit to Consumers from Generic Scoring Models Based on Credit Reports. Chandler et al., The MDS Group Atlanta, Georgia, Jul. 1, 1991, Abstract.*

What's the Score. Walter Alexander, ABA Banking Journal, vol. 81, 1989, Abstract.*

International Search Report and Written Opinion in PCT Application No. PCT/US2007/21815; Dated Sep. 5, 2008 in 11 pages.

International Search Report and Written Opinion for PCT/US2007/63822, filed Mar. 12, 2007.

International Search Report and Written Opinion for PCT/US2007/63823, filed Mar. 12, 2007.

International Search Report and Written Opinion for PCT/US2007/63824, filed Mar. 12, 2007.

International Search Report and Written Opinion for PCT/US2007/06070, filed Mar. 9, 2007.

eFunds Corporation, "Data & Decisioning," Debit Report as downloaded from http://web.archive.org/web/20070220220934/www.efunds.com/web/industry-solutions/financial-services/frm-debit-report.htm on Oct. 5, 2009.

Jacob, Katy et al., "A Case Study of Checking Account Inquiries and Closures in Chicago," The Center for Financial Services Innovation, Nov. 2006.

"New FICO score extends lenders' reach to credit-underserved millions", Viewpoints: News, Ideas and Solutions from Fair Isaac, Sep./Oct. 2004 as downloaded from http://www.fairisaac.com/NR/exeres/F178D009-B47A-444F-BD11-8B4D7D8B3532.fram.

Burr Ph.D., Sara et al., "Payment Aggregation and Information Dissemination (Paid): Annotated Literature Search", Asset Builders of America, Inc., Sep. 2005.

* cited by examiner

| Field | Entry |
|---|---|
| First Name | John |
| Last Name | Doe |
| Address | 2040 Main Street |
| City | Irvine |
| State | CA |
| ZIP | 92614 |
| ZIP+4 | 7216 |
| Customer PIN | 1234567 |
| Age | 45 |
| Length Of Residence | 5 |
| Demographic Data * * * | |
| Scoreable Credit Data * * * | |

501 — 510: First Name, Last Name; 520: Address, City, State, ZIP, ZIP+4; 530: Customer PIN; 540: Age; 550: Length Of Residence; 560: Demographic Data; 570: Scoreable Credit Data

Figure 5A

| Field | Entry |
|---|---|
| First Name | John |
| Last Name | Doe |
| Address | 2040 Main Street |
| City | Irvine |
| State | CA |
| ZIP | 92614 |
| ZIP+4 | 7216 |
| Customer PIN | 1234567 |
| Age | 45 |
| Length Of Residence | 5 |
| Demographic Data * * * | |
| (Empty) Scoreable Credit Data * * * | |

502 — 510: First Name, Last Name; 520: Address, City, State, ZIP, ZIP+4; 530: Customer PIN; 540: Age; 550: Length Of Residence; 560: Demographic Data; 570: (Empty) Scoreable Credit Data

Figure 5B

| Field | Entry |
| --- | --- |
| First Name | John |
| Last Name | Doe |
| Address | 2040 Main Street |
| City | Irvine |
| State | CA |
| ZIP | 92614 |
| ZIP+4 | 7216 |
| Customer PIN | 1234567 |
| Age | 45 |
| Length Of Residence | 5 |
| Demographic Data | |
| * | |
| * | |
| * | |
| (One Entry) Scoreable Credit Data | |
| * | |
| * | |
| * | |
| Transaction Entry | Good Standing |

503

510 — First Name, Last Name
520 — Address, City, State, ZIP, ZIP+4
530 — Customer PIN
540 — Age
550 — Length Of Residence
560 — Demographic Data
570 — Scoreable Credit Data
580 — Transaction Entry

Figure 5C

SYSTEMS AND METHODS FOR DETERMINING THIN-FILE RECORDS AND DETERMINING THIN-FILE RISK LEVELS

CROSS-REFERENCE TO RELATED APPLICATIONS

This application is based upon and claims the benefit of priority from U.S. Provisional Patent Application No. 60/923,060 filed on Apr. 12, 2007, the entire contents of which are incorporated herein by reference. All publications and patent applications mentioned in this specification are herein incorporated by reference to the same extent as if each individual publication or patent application was specifically and individually indicated to be incorporated by reference.

TECHNICAL FIELD

This disclosure relates generally to financial data processing systems, and more particularly to methods and systems for developing filters to identify thin-file credit records and assess a risk level associated with thin-file credit records.

DESCRIPTION OF THE RELATED ART

Various financial service providers provide credit accounts such as mortgages, automobile loans, credit card accounts, and the like, to consumers. Financial service providers typically determine whether or not to offer a particular consumer a credit account and on what terms based upon a credit history acquired by the consumer over a period of time. A consumer credit history may reflect the credit related activities of the consumer, such as taking out loans, making payments, or the like, and may be embodied in a report or score.

However, some consumers have little or no credit history. For example, young people often do not have any credit history. This situation can make it difficult for a financial service provider to determine whether a consumer represents a "good" or "bad" credit risk, even though reaching the consumer before they have a significant credit history may be an effective way to build new business.

SUMMARY OF THE INVENTION

Accordingly, systems and methods are disclosed for determining the likelihood of a consumer having a thin-file record (for example, little or no credit record) and assessing a risk level associated with a potential thin-file consumer.

According to one embodiment, a computing system may determine whether existing credit records are either scoreable records or thin-file records. The two groups of records may be analyzed, such that non-credit data variables that correlate or are otherwise related to a likelihood of an individual being a thin-file record are determined. These correlated variables are weighted and combined to generate a multi-level filter. The multi-level filter is configured to provide a score related to a likelihood of an individual having a thin-file record based on non-credit data.

According to another embodiment, a computing system filters thin-file records to determine those having at least one transaction entry. Those thin-file records that have at least one transaction entry are further filtered based on whether the transaction entry is in good standing. Demographic characteristics and non-credit data that correlate with or are otherwise related to being a "good" or "bad" credit risk are determined by comparing the characteristics of those thin-file records having a transaction entry that is "good" with those that are "bad." A multi-level filter is developed based on these variables that provides a score related to the credit-risk associated with a thin-file record based on non-credit data.

These and additional embodiments are discussed in greater detail below. Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings and examples which form a portion of the specification, in which:

FIGS. 5A-C show credit database records utilized to develop the thin-file filters according to one embodiment.

DESCRIPTION OF THE PREFERRED EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
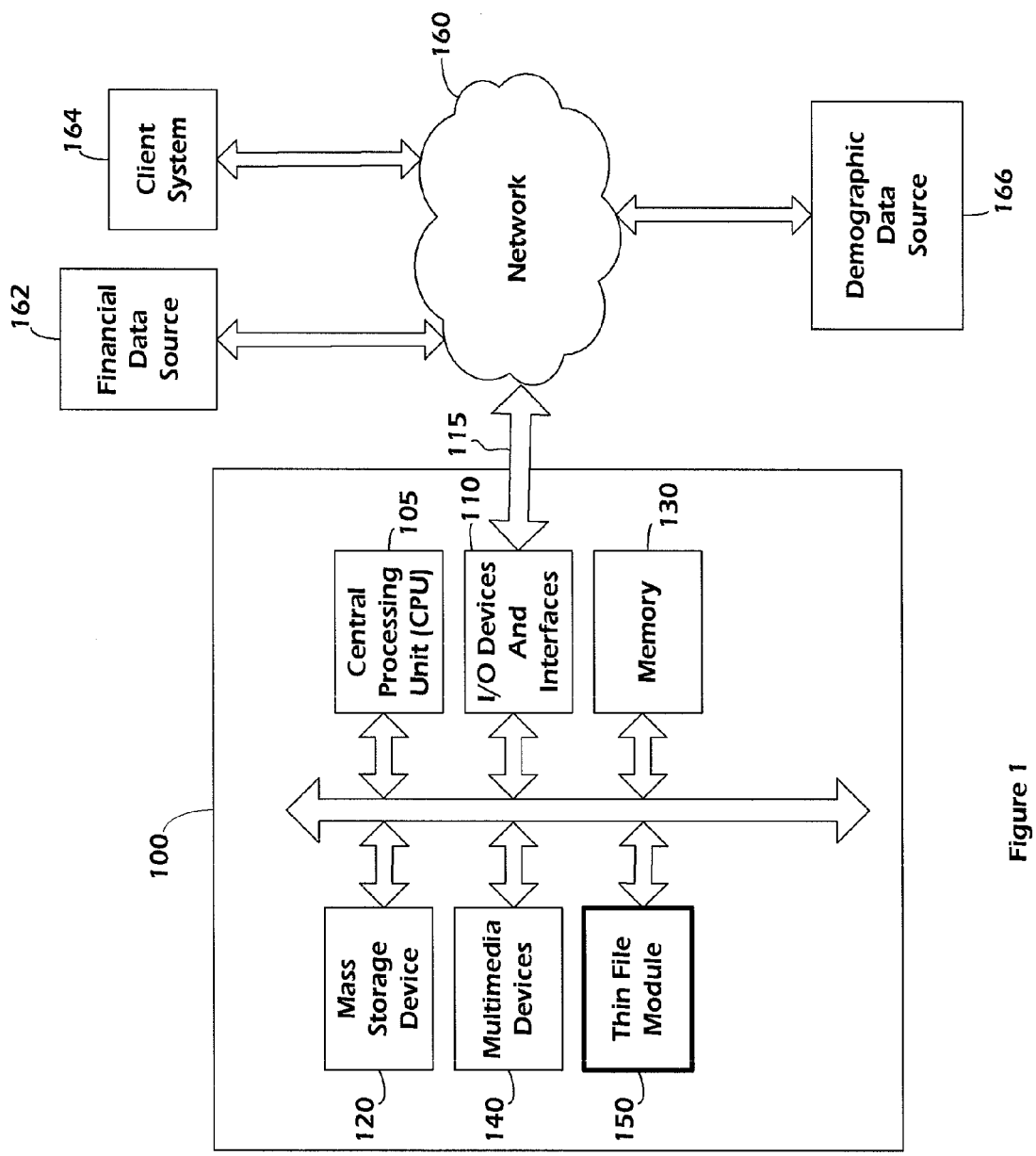
FIG. 1 is a block diagram of a system for generating and applying filters to determine a likelihood of being a thin-file record and an associated risk level according to one embodiment.

FIG. 1 is one embodiment of a block diagram of a computing system 100 that is in communication with a network 160 and various devices and/or systems that are also in communication with the network 160. The computing system 100 may be used to implement certain systems and methods described herein. For example, the computing system 100 may be configured to analyze demographic information in order to determine a likelihood that a consumer has a thin-file record and to determine a credit risk associated with the thin-file record. Although the description provided herein refers to individuals, consumers, or customers, the terms "individual," "consumer," and "customer" should be interpreted to include applicants, or groups of individuals or customers or applicants, such as, for example, married couples or domestic partners, and business entities. The functionality provided for in the components and modules of computing system 100 may be combined into fewer components and modules or further separated into additional components and modules.

The computing system 100 includes, for example, a personal computer that is IBM, Macintosh, or Linux/Unix compatible. In one embodiment, the computing system 100 comprises a server, a laptop computer, a cell phone, a personal digital assistant, a kiosk, or an audio player, for example. In one embodiment, the exemplary computing system 100 includes a central processing unit ("CPU") 105, which may include a conventional microprocessor. The computing system 100 further includes a memory 130, such as random access memory ("RAM") for temporary storage of information and a read only memory ("ROM") for permanent storage of information, and a mass storage device 120, such as a hard drive, diskette, or optical media storage device. Typically, the modules of the computing system 100 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 100 is generally controlled and coordinated by operating system software, such as Windows 95, Windows 98, Windows NT, Windows 2000, Windows XP, Windows Vista, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

In the embodiment of FIG. 1, the computing system 100 also includes a thin-file module 150 that may be executed by the CPU 105. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Thin-file module 150 of the computing system 100 operates to generate filters that are applied to consumer records in a demographic database for determining whether a consumer is likely to be a thin-file record and to define a risk level associated with potential thin-file records, based on demographic data and/or other non-credit data. It is also recognized that other data may be used. The thin-file module 150 further operates to apply these filters to existing and potential customer demographic database records, and to generate reports based on the application of these filters. For example, a report may be generated for a client system 164 that indicates individual consumers or groups of consumers having certain characteristics associated with "good" risk thin-file consumers so that the client system 164 may target marketing efforts to those consumers. Thin-file module 150 and the operations thereof are described in more detail below.

The exemplary computing system 100 includes one or more commonly available input/output (I/O) devices and interfaces 110, such as a keyboard, mouse, touchpad, and printer. In one embodiment, the I/O devices and interfaces 110 include one or more display device, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the computing system 100 communicates with a network 160, such as a LAN, WAN, or the Internet, for example, via a wired, wireless, or combination of wired and wireless, communication link 115. The network 160 communicates with various computing devices and/or other electronic devices and/or systems via wired or wireless communication links.

According to FIG. 1, information is provided to computing system 100 over the network 160 from one or more data sources including, for example, one or more of the financial data sources 162, the client system 164, and one or more demographic data sources 166. The information supplied by the various data sources may include credit data, demographic data, application information, product terms, accounts receivable data, and financial statements, for example. Financial data sources may comprise a regulated credit database storing consumer records having demographic data, non-credit data, and credit data. Demographic data source 166 may comprise an unregulated demographic database storing consumer records having demographic and other non-credit data.

In addition to the devices and systems that are illustrated in FIG. 1, the network 160 may communicate with other data sources or other computing devices and/or systems. In addition, the data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

Client system 164 may include, for example, a financial service provider or a collection agency. One client system 164 is shown, but any number of clients 164 may communicate with the computing system 100 over the network 160. The client system 164 may provide data related to consumer credit activity, such as opening new accounts, making payments on existing accounts, or the like. In addition to supplying data, client system 164 may further request and/or receive information from the computing system 100. For example, the client system 164 may request information related to thin-file accounts analyzed by the computing system 100.

The network 160 may comprise one or more networks in some embodiments, as described above. The financial data sources 162, client system 164, demographic data sources 166, and any additional data sources may communicate over the same network or over different networks. For example, financial data sources 162 may comprise public data available over the Internet, while the computing system 100 may access demographic data source over a secured LAN. In some embodiments, one of the data sources such as financial data sources 162 comprises multiple sources, and some of the sources are available to computing system 100 over the network 160 while others are accessed via another connection, such as a LAN.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Figure 2:
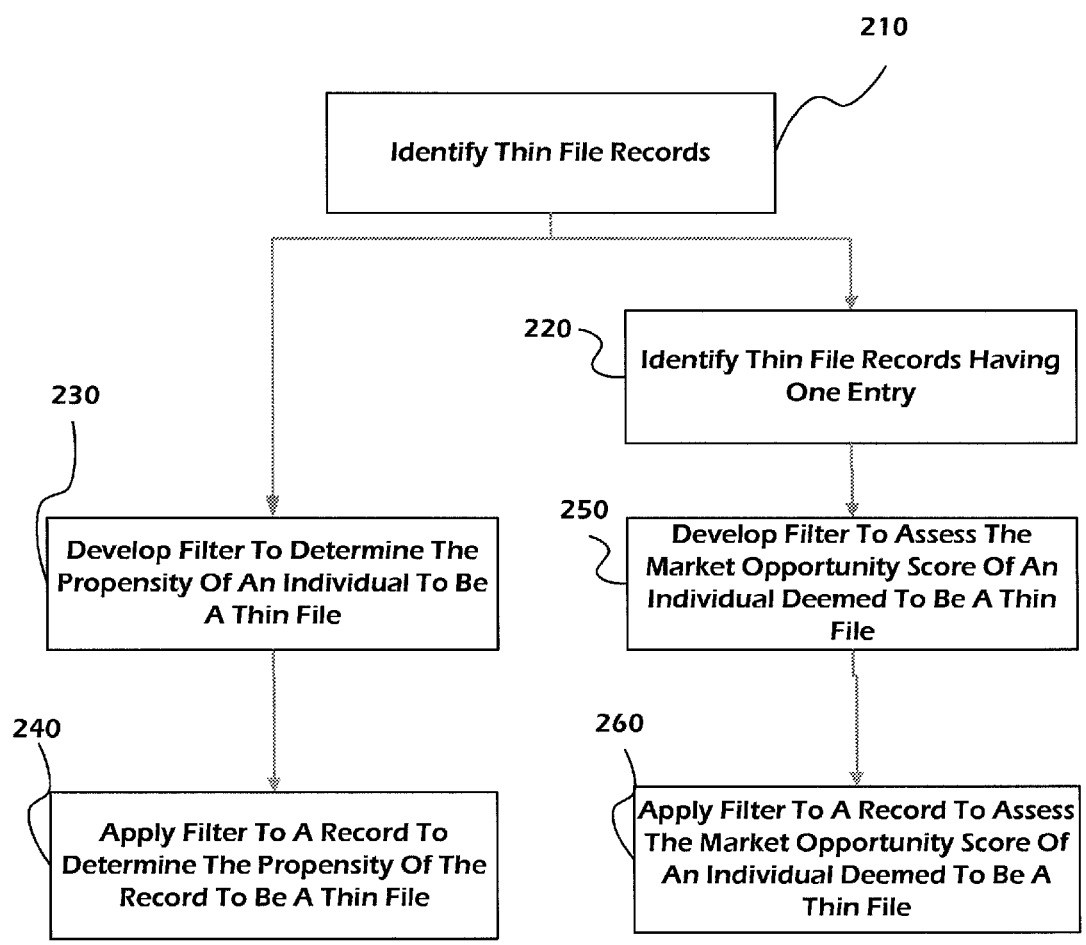
FIG. 2 is a flowchart showing a process for generating and applying filters to determine a likelihood of being a thin-file record and an associated risk level according to one embodiment.

FIG. 2 shows one embodiment of a process 200 for identifying thin-file records and developing filters for analyzing new thin-file applicants based on demographic or other non-credit data. In some embodiments, the process 200 is a computer-implemented process that is stored and runs on the computing system 100. In one embodiment, the process 200 applies the filter to the data based on two or more attributes or collections of attributes of consumer records in a demographic database. Thus, the filter may be a single-level filter or a multi-level filter. As one example, one level of the filter may be directed to one or more of the demographic data fields such as marital status whereas another level of the filter may be directed to attributes associated with a geographic area.

Process 200 begins at state 210 where thin-file records are identified. Thin-file records may be identified, for example, within a credit database stored by computing system 100 or available as a financial data source 162 over the network 160. In one embodiment, thin-file records comprise those records which do not include a sufficient amount of credit related data to provide a score or other metric for assessing the creditworthiness of a consumer associated with that record. For example, consumers that do not have a long credit history, have never had a credit card or a loan, or for whatever reason, do not have sufficient amount of credit data to develop a score may be identified as thin-file records. In some embodiments, thin-file records are those records having either zero transaction entries or one transaction entry, where a transaction entry corresponds to a credit related activity such as applying for a loan or taking out a credit card. In some embodiments, the records relate to a specific country or region.

At state 220, those records identified as being thin-file records and having at least one transaction entry are identified. Thus, at state 220, records within a credit database may be identified as either a scoreable record, a thin-file record having at least one transaction entry, or a thin-file record.

At state 230, a filter is developed to determine the propensity of an individual to be a thin-file record based on demographic data in the records of the credit database. In one embodiment, based on the tracked thin-file records identified at state 210, a filter is developed that, when applied to a set of data in a demographic database, determines whether or not a consumer is likely to be a thin-file record based on non-credit data. At state 240, the filter is applied to a record in a demographic database, for example of a new or potential credit applicant, to determine whether or not the consumer related to that record is likely to be a thin-file record. In other embodiments, the filter is applied to a set of consumer records in a demographic database. In other embodiments, other databases may be used.

The one-entry thin-file records identified at state 220 may also be used to develop a filter at state 250 to assess the risk score of an individual deemed to be a thin-file. For example, those one-entry thin-file records may be filtered to determine whether or not the existing entry represents "good" or "bad" credit activity. The state of being a "good" or "bad" credit risk, or a quantitative representation of credit worthiness along a scale, may be correlated with demographic information or other non-credit data included within the credit record. Thus, a filter may be developed for assessing a risk level that is not dependent on credit information, but rather on demographic data and other information that is likely to be available for a potential applicant from a demographic database. At state 260 the filter developed at state 250 is applied to a record in a demographic database to determine the risk score of an individual deemed to be a thin-file record.

As an example case, the filters developed at state 230 may be used to identify particular demographic groups, such as those people living in a certain area or having certain characteristics, that are likely to be thin-file records. Records corresponding to those groups may be further analyzed by the filter developed at state 250 to determine whether or not they are likely to be "good" credit risks. Thus, for example, a group of people such as those people in a zip code area that is known to have "good" credit consumers living therein may be targeted, for example, for a mailing campaign.

Figure 3:
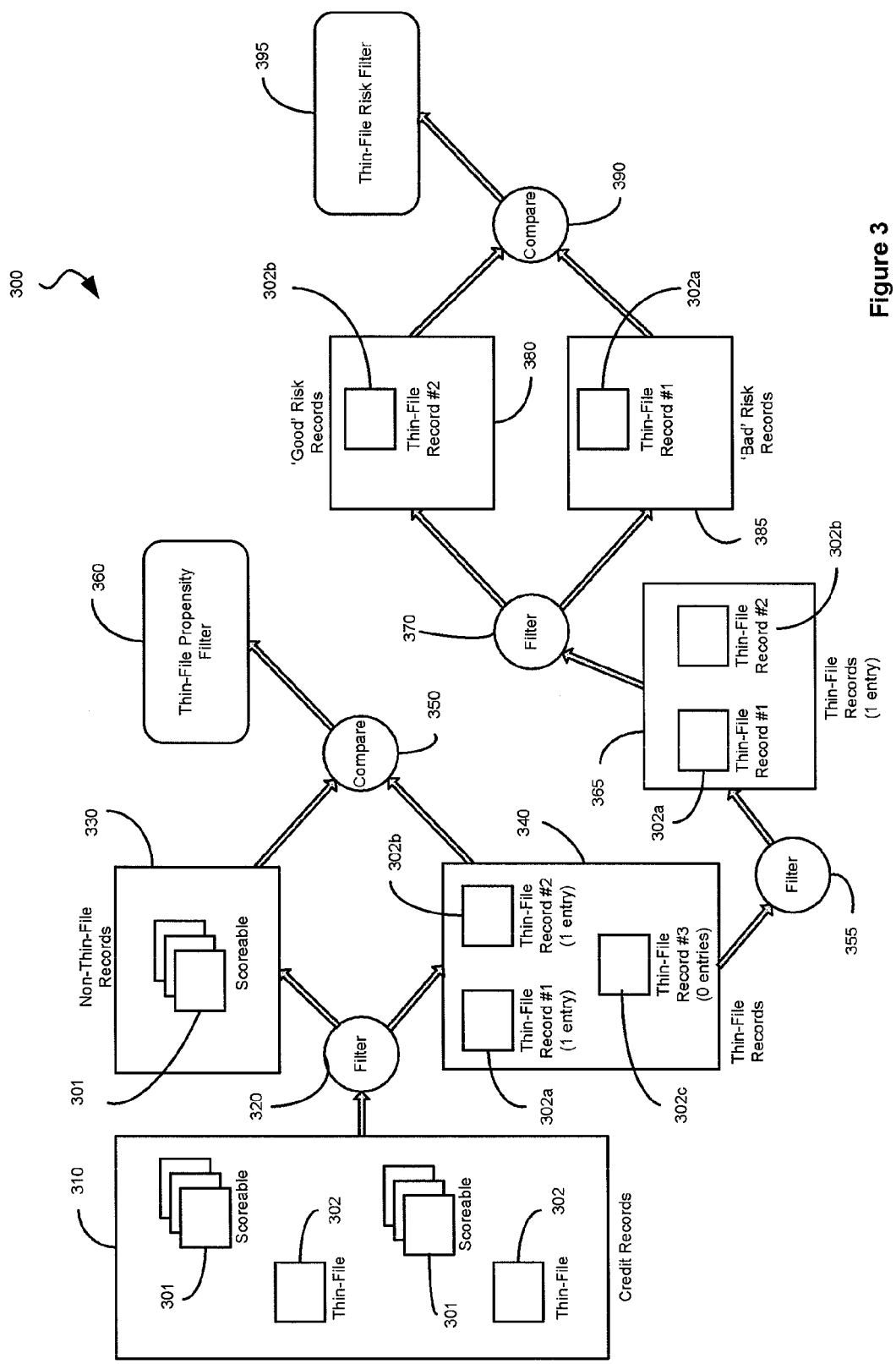
FIG. 3 is a process diagram showing the processing of credit records to develop thin-file filters according to one embodiment.

FIG. 3 is a diagram showing one embodiment of a process 300 for filtering and comparing credit records in order to develop a thin-file propensity filter 360 and a thin-file risk filter 395. In some embodiments, the process 300 is a computer-implemented process that is stored and runs on the computing system 100. The process 300 begins when credit records 301 and 302 in a credit record database 310 are filtered at state 320. The credit record database 310 may, according to some embodiments, be stored in the memory 130 of the computing system 100 and/or may be accessed over the network 160. The credit record database 310 may comprise records relating to a large number of consumers, such as more than one million. In some embodiments, credit database 310 is a regulated database. Credit record database 310 comprises scoreable credit records 301 and thin-file (for example, non-scoreable) credit records 302. Records in a set of the records are compared at state 320. In some embodiments, the set is all of the records, a subset of the records, or a random subset of the records. Those records that are determined to be thin-file records may be identified as a thin-file record collection 340. Those records that are scoreable may be identified as a non-thin-file record collection 330.

As shown, scoreable record collection 330 comprises scoreable record 301 sorted by a filter at state 320 from credit database 310. Scoreable record collection 330 may identify any number of scoreable records 301.

Thin-file record collection 340 comprises thin-file records 302a, 302b, and 302c filtered from credit database 310 at state 320. Three thin-file records 302a, 302b, and 302c are shown in FIG. 3. However, any number of thin-file records may be identified in thin-file record collection 340. The number of thin-file records stored in the thin-file record collection 340 is related to the number of thin-file records stored in credit database 310.

In order to develop the thin-file propensity filter 360, records identified by scoreable record collection 330 and records identified by thin-file record collection 340 are compared at state 350. That is, all or a subset of the scoreable records 301 identified by the scoreable record collection 330 are compared with all or a subset of the thin-file records 302 identified by the thin-file record collection 340 at state 350.

The scoreable records 301 are compared with thin-file records 302 on the basis of, for example, the demographic information therein. It is determined at state 350 what demographic characteristics or other non-credit data correlates to, is dependent on, or is otherwise related to a record being either a thin-file record 302 or a scoreable record 301. Certain characteristics or variables may be directly related, such as a length of time at a current residence. Other variables may be indirectly related. For example, it may be determined that individuals living within a geographic area having certain characteristics such as a low average income are more likely to have thin-file records. In that case, the thin-file propensity filter 360 may be developed such that the geographic area in which a consumer resides and the characteristics of that area are taken into account. In general, the thin-file propensity filter 360 may apply weights to values of certain characteristics. In addition to those mentioned above, characteristics used to determine whether or not an individual is likely to be a thin-file record may comprise, for example, the individual consumer's percentage of bank cards reported delinquent in a geographic area, the length of residence at the consumer's current residence, the average length of residence for consumers in a certain geographic area, the percentage of households in an area comprising families rather than individuals, the age of the consumer, some combination of these or other characteristics, or the like. In some embodiments, certain characteristics may be excluded even though they are determined to be related. For example, a consumer age may be relevant but removed because certain credit decisions made by a client 164 cannot be dependent on age according to government regulations. Characteristics may be converted into quantitative representations. For example, a characteristic may comprise a consumers' presence in an age group between 18-20 years old, corresponding to a "yes" or "no" value. A quantitative value of "1" or "0" may be assigned to each possibility. The quantitative representations may comprise binary values as described above, some other set of discrete values, or numerical values along a continuous scale. The values are weighted in the filter according to their importance or correlation to the presence or absence of a thin-file condition.

FIG. 3 also shows a process for developing a thin-file risk filter 395. While the development of thin-file risk filter 395 is shown interleaved with that for creating thin-file propensity filter 360, the two may be independent.

Utilizing a thin-file record collection 340, the thin-file records are filtered at state 355 to identify those thin-file records having one transaction entry. As shown in FIG. 3, thin-file records 302a and 302b have only one entry, while thin-file record 302c has zero entries. Thin-file records 302a and 302b are therefore identified in a one-entry collection 365. One-entry collection 365 is shown identifying two thin-file records, but may identify any number of thin-file records. While the embodiment shown filters the thin-file records 302 based on whether they comprise one or zero entries, in some embodiments the thin-file records may comprise more than one entry, and the filter 355 may filter the thin-file records based on some other predetermined minimum number of entries.

At state 370 thin-file records identified by one-entry collection 365 are filtered. Thin-file records 302a and 302b are filtered to determine whether or not these records correspond to "good" or "bad" credit risks. Although thin-file records 302a and 302b are shown being filtered, all of the records identified by the one-entry collection 365, or a subset of the records identified by the one-entry collection 365, may be filtered. Filtering may comprise a determination of the existing transaction entry for a thin-file record is a "good" risk or a "bad" risk. After it is determined whether or not thin-file records 302a and 302b are "good" or "bad" credit risks, they are identified by "good" risk collection 380 or "bad" risk collection 385. In the example shown, "good" risk collection 380 identifies thin-file record 303b. "Bad" risk collection 385 identifies thin-file record 303a.

At state 390, the records identified by "good" risk collection 380 and "bad" risk collection 385 are compared. The compared records are used to generate a thin-file risk filter 395. Thin-file risk filter 395 determines the likelihood of a thin-file record being a "good" or "bad" risk based on demographic data or other non-credit data. "Good" risk records 302b identified by collection 380 are compared with "bad" risk records 302a identified by collection 385 to determine those demographic or other non-credit characteristics most closely correlated with or otherwise related to being a "good" or "bad" risk. For example, data that may be used to indicate whether or not an applicant is likely to be a "good" credit or "bad" credit risk may comprise the likelihood of individuals in the same geographic area being "good" or "bad" credit risks, the number of credit related accounts or activities certain geographic area engages in, an age group, scores based on such characteristics as average income in a geographic area or purchasing habits of people living in the geographic area, or the like.

Thin-file risk filter 395 may therefore be used to determine, based on demographic characteristics of a potential thin-file applicant stored in a demographic database, whether or not that applicant is likely to be a "good" or a "bad" risk. Thin-file risk filter 395 may, for example, provide a score for a consumer based on the determined characteristics that are significant, and that score may be associated with a certain likelihood that the applicant is a "good" risk. A high score may correspond to a high likelihood of being a "good" risk. For example, the highest possible score for the thin-file risk filter 395 may correspond to a 75% chance of being a "good" risk. The score may be a quantitative representation of the risk associated with a thin-file applicant such as, for example, a credit risk. The scale of the score may be arbitrary or may be aligned with well known credit scoring systems or other scoring systems.

Figure 4:
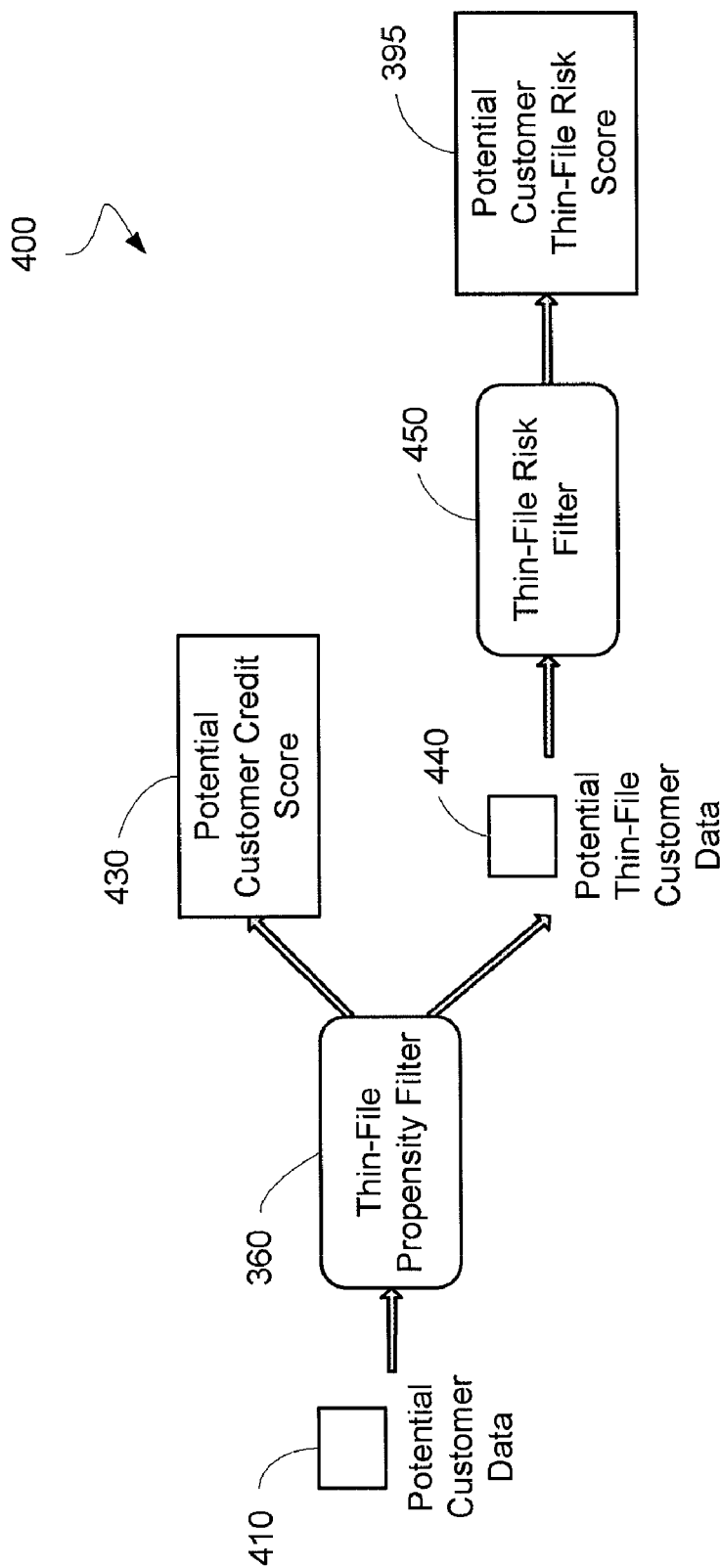
FIG. 4 is a process diagram showing the processing of potential customer data by the filters developed in FIG. 3 according to one embodiment.

FIG. 4 shows a system process 400 for utilizing a thin-file propensity filter 360 and a thin-file risk filter 395 in order to determine whether or not a potential customer is likely to be a thin-file record and what risk is likely associated with the potential customer. In some embodiments, the process 400 is a computer implemented process that is stored and runs on the computing system 100. The process 400 shows the application of the thin-file propensity filter 360 and the thin-file risk filter 450 as related processes, such that a portion of the files output by the thin-file propensity filter 360 may be used as input files by the thin-file risk filter 450. However, the filters may also be utilized independently, as both may operate on existing data and provide independently useful results.

Process 400 begins with potential customer data 410. Potential customer data 410 may reflect, for example, demographic data for a specific applicant or for one or more groups of applicants or potential applicants, such as potential targets for a direct mailing campaign.

Demographic information from potential customer data 410 is provided as an input to the thin-file propensity filter 360 from a demographic database. The thin-file propensity filter 360 is applied to the potential customer data 410 for each consumer to generate a score related to the likelihood of the consumer being a thin-file record based on non-credit data.

Based on the score or likelihood determined by the thin-file propensity filter 360, consumer records in potential customer data 410 are identified as either scoreable records or thin-file records. For example, a cut-off score may be determined, and any consumer having a score higher than that value may be determined to be a potential thin-file record 440. In some embodiments, this score is a score for which there is a greater than 50% likelihood that a record is a thin-file record. For those records which are not thin-file records, a potential customer credit score 430 may be determined. Those records that have a score above the predetermined value may comprise known thin-file records 440.

A thin-file risk filter 450 may be applied to potential thin-file records 440 in order to determine the potential customer risk score 460. For example, potential thin-file customer data 440 may comprise demographic information associated with one or more consumers or potential customers obtained from a demographic database. Demographic information may include, for example, the consumer's age, the consumer's residence, the length at that residence, the geographic area surrounding the residence, or some other demographic indicator. The thin-file risk filter may take this demographic information as an input and analyze characteristics that determine if a potential customer is a thin-file risk 460. The thin-file risk filter may directly associate certain geographic data, but may also associate economic indicators associated with certain geographic locations in order to determine a potential customer thin-file risk score 460. Potential customer thin-file risk score 460 may be utilized to determine whether or not to provide an applicant a credit account, or the specific terms associated with an account to offer a potential customer. In other embodiments, a potential customer thin-file risk score 460 may be used to determine whether or not to direct marketing efforts towards a potential customer.

FIGS. 5A-C show example embodiments of records from a credit database that may be utilized according to generate the thin-file filters described above. For example, FIG. 5A shows a record 501 comprising a scoreable credit record. Scoreable credit record 501 comprises first and last name fields 510, geographic residence fields 520, a customer pin field 530 comprising a unique identifier, an age field 540, a length of residence field 550 identifying the amount of time the consumer has lived at his or her current residence, demographic data fields 560, and scoreable credit data 570. Demographic data field 560 may comprise, for example, other demographic data not shown in the other fields above and/or one or more of the data fields shown may be excluded. Scoreable credit data 570 may comprise, for example, information on loan accounts, outstanding credit accounts, payment histories, and the like.

FIG. 5B shows a non-scoreable or thin-file credit record 502. Credit record 502 comprises name fields 510, address fields 520, customer pin 530, age field 540, length of residence field 550, and demographic data 560. Potential customer record 502 further comprises scoreable credit data 570. However, for customer record 502, the scoreable credit data is empty, and therefore insufficient to form a credit record or to score the credit record. Thus, the credit record 501 shown in FIG. 5A would be associated with a scoreable record, while credit entry 502 shown in FIG. 5B would be associated with a thin-file record.

FIG. 5C shows the credit record 503 for a thin-file record from a credit database. The record 502 includes one transaction entry that may be analyzed in order to determine whether or not the record 502 is a "good" or "bad" credit risk. The record 503 has a single credit entry 580 identifying that the single transaction represents an account in good standing.

Figure 6:
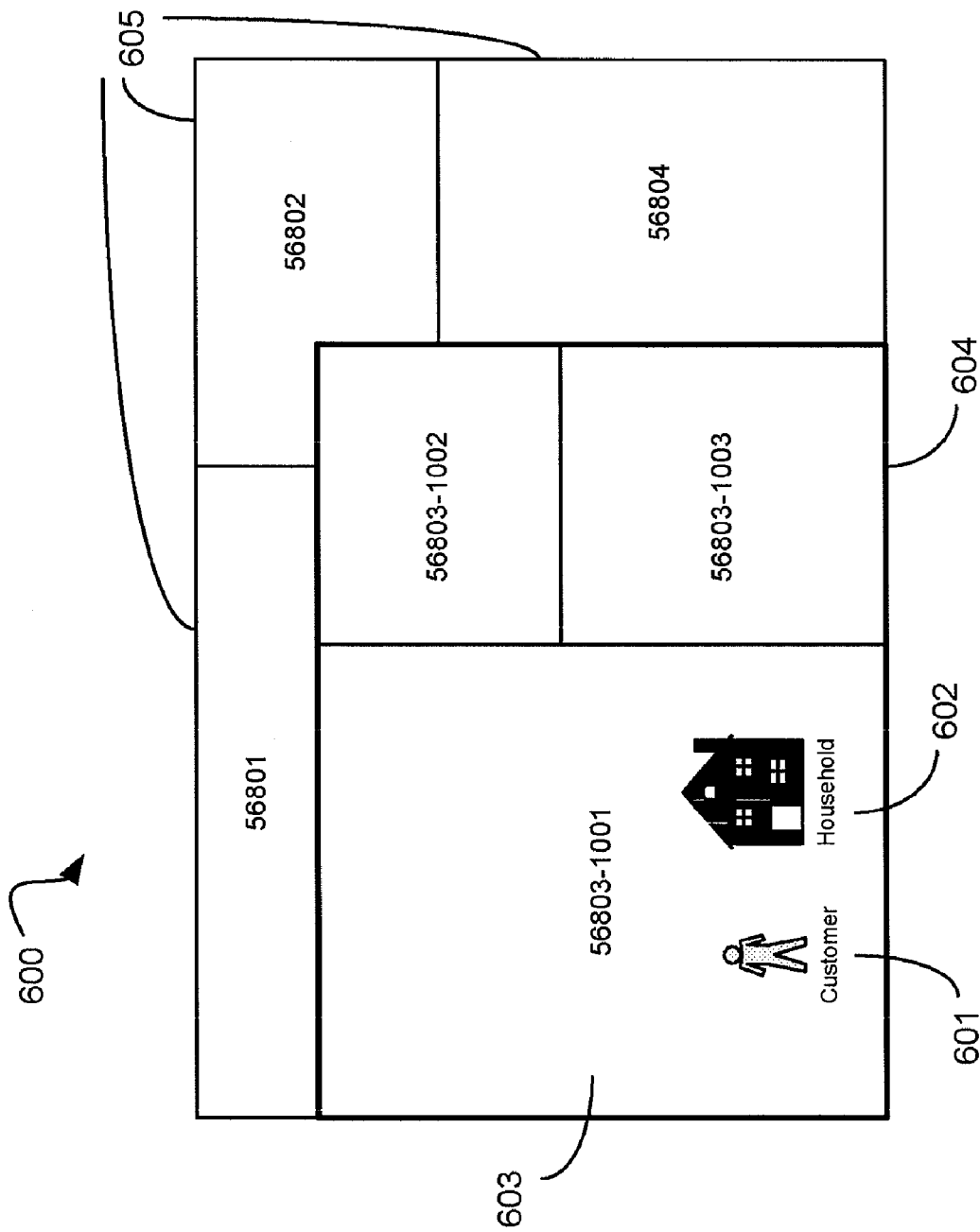
FIG. 6 is a diagram showing various levels of specificity for analyzing demographic data for the thin-file filters according to one embodiment.

FIG. 6 shows one embodiment of an example of different levels of geographic distinctions, in order to demonstrate types of demographic data that may be utilized. FIG. 6 shows a map 600 comprising different areas with different postal codes such as, for the United States, zip codes and zip+4 area codes. For example, map 600 comprises three different zip codes including 56801, 56802, 56803 and 56804. The zip code 56803 corresponding to area 604 is identified here as including potential customers. Potential customer 601, in a household 602 and an area 603, corresponds to zip code 56803-1001. Information concerning the zip+4 area 603 in the zip area 604, may be used as demographic information associated with customer 601 to determine the likelihood of customer 601 being a thin-file record. If customer 601 is a thin-file record, then the likelihood of customer 601 being a "good" or "bad" credit risk may be determined. Information related to household 602 may also be used in the determination, as well as information specifically related to customer 601, such as age.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computing system, comprising:
   a computer-readable storage comprising a database and storing a plurality of records, the plurality of records comprising demographic data and credit data;
   a processor configured to access the plurality of records in the computer-readable storage and configured to filter, from the plurality of records, records that include less than a minimum number of credit data entries;
   a thin-file module configured to access the filtered records that include less than the minimum number of credit data entries and determine demographic data that is correlated with the filtered records by at least,
   identifying demographic characteristics that appear within the demographic data of the filtered records; and
   associating a weight with each of the demographic characteristics, the weight being based at least in part on the correlation of the demographic characteristic with a likelihood of a record being a thin-file record;
   a data record filter configured to predict a likelihood that a record will include less than the minimum number of credit data entries by at least comparing the correlated demographic data to demographic data associated with the record, the demographic data comprising one or more of the following:
   residence address data;
   age data;
   household data;
   marital status data;
   delinquent data for consumers in a geographic area;
   data related to length of residency; and,
   a communications link configured to receive a customer record comprising a set of customer demographic data,
   wherein the data record filter is further configured to generate a score corresponding to the likelihood of the customer record having less than the minimum number of credit data entries by at least, locating, within the set of customer demographic data, demographic characteristics identified within the demographic data of the filtered records;

assigning a value to each located demographic characteristic in accordance with the weight associated with the demographic characteristic; and, combining the values assigned to the located demographic characteristics to generate the score.

2. The system of claim 1, wherein the minimum number of credit data entries is one.

3. A computer implemented method of developing a filter for thin-file records comprising:

accessing, by a computer processor, a database storing a plurality of records, each of the records comprising demographic data fields and credit data fields;

identifying, by a computer processor, a first subset of the plurality of records stored in the database, the first subset corresponding a first type comprising those records that include at least a minimum number of credit data entries;

identifying, by a computer processor, a second subset of the plurality of records stored in the database, the second subset of records corresponding to a second type comprising those records that do not include at least the minimum number of credit data entries;

determining, by a computer processor, demographic data fields that are correlated with the first type of records, the determining further comprising:

identifying, by a computer processor, demographic characteristics that appear within the demographic data fields of the first type of records; and, associating, by a computer processor, a weight with each of the demographic characteristics, the weight being based at least in part on the correlation of the demographic characteristic with a likelihood of a record being the first type of records;

developing, by a computer processor, a data record filter that predicts a likelihood of a record comprising demographic data fields being of the first type by at least comparing the demographic data fields of the record to the correlated demographic data fields;

receiving, by a computer processor, a set of customer data comprising customer demographic data; and generating, by a computer processor, a score by at least, locating, by a computer processor, within the customer demographic data, demographic characteristics identified within the demographic data fields of the first type of records;

assigning, by a computer processor, a value to each located demographic characteristic in accordance with the weight associated with the demographic characteristic; and combining, by a computer processor, the values assigned to the located demographic characteristics to generate the score, wherein the demographic data fields comprise one or more of the following:
residence address data;
age data;
household data;
marital status data;
delinquent data for consumers in a geographic area; and
data related to length of residency.

4. The computer implemented method of claim 3, wherein the minimum number of credit data entries is one.

5. The computer implemented method of claim 3, wherein the second subset is a thin-file collection.

6. A computing system, comprising:

a computer-readable storage comprising a database and storing a plurality of records, the plurality of records comprising demographic data and credit data, the records comprising thin-file records;

a processor configured to access the plurality of thin-file records in the computer-readable storage and configured to filter the thin-file records according to whether the credit data in the thin-file records corresponds to a positive credit activity;

a thin-file module configured to access the filtered thin-file records having credit data corresponding to a positive credit activity and determine demographic data that is correlated with the filtered thin-file records by at least, identifying demographic characteristics that appear within the demographic data of the filtered thin-file records; and associating a weight with each of the demographic characteristics, the weight being based at least in part on the correlation of the demographic characteristic with a likelihood of a record having credit data corresponding to a positive credit activity;

a data record filter configured to predict a likelihood of thin-file records having credit data corresponding to a positive credit activity based at least in part on the correlated demographic data; and a communications link configured to receive a record of a thin-file customer comprising a set of customer demographic data associated with the thin-file customer, wherein the data record filter is further configured to generate a score corresponding to the likelihood of the record of the thin-file customer having credit data corresponding to a positive credit activity by at least, locating, within the set of customer demographic data, demographic characteristics identified within the demographic data of the filtered thin-file records;

assigning a value to each located demographic characteristic in accordance with the weight associated with the demographic characteristic; and combining the values assigned to the located demographic characteristics to generate the score, and wherein the demographic data comprises one or more of the following:
residence address data;
age data;
household data;
marital status data;
delinquent data for consumers in a geographic area; and
data related to length of residency.

7. A computer implemented method of generating a filter for determining a risk level associated with a thin-file record, comprising:

accessing, by a computer processor, a database storing a plurality of thin-file records, the thin-file records comprising demographic data and credit data;

monitoring, by a computer processor, the plurality of thin-file records in order to determine a status of each of the records based on the credit data of the record, the status indicating a credit risk;

determining, by a computer processor, demographic data that is correlated with the status of each of the records, the determining further comprising:

identifying, by a computer processor, demographic characteristics that appear within the demographic data of the thin-file records having credit data reflective of a credit risk; and associating, by a computer processor, a weight with each of the demographic characteristics, the weight being based at least in part on the correlation of the demographic characteristic with a likelihood of a record having credit data reflective of a credit risk;

developing, by a computer processor, a data record filter that predicts the probable credit risk of a record based on the correlated demographic data;

receiving, by a computer processor, a set of customer data associated with a thin-file customer, the customer data comprising customer demographic data corresponding to at least a portion of the correlated demographic data; and generating, by a computer processor, a score, the generating further comprising:

locating, by a computer processor, within the customer demographic data, demographic characteristics identified within the demographic data of the thin-file records having credit data reflective of a credit risk;

assigning, by a computer processor, a value to each located demographic characteristic in accordance with the weight associated with the demographic characteristic; and combining, by a computer processor, the values assigned to the located demographic characteristics to generate the score, wherein the demographic data comprises one or more of the following:

residence address data;
age data;
household data;
marital status data;
delinquent data for consumers in a geographic area; and
data related to length of residency.

8. A computer implemented method for predicting the likelihood of a consumer having limited credit history, the method comprising:

receiving, by a computer processor, a data record of a consumer, the data record comprising consumer demographic data;

creating, by a computer processor, a data record filter that identifies a plurality of demographic characteristics in known thin-file records and a correlation for each of the plurality of demographic characteristics to a likelihood of a record being a thin-file record;

generating, by a computer processor, a score indicating a likelihood of the data record of the consumer being a thin-file record by at least:

locating, by a computer processor, within the consumer demographic data, demographic characteristics identified by the data record filter as present in the demographic data of known thin-file records;

assigning, by a computer processor, a value to each located demographic characteristic in accordance with a weight associated with each of the demographic characteristics, the weight being based at least in part on the correlation of the demographic characteristic with a likelihood of a record being a thin-file record;

combining, by a computer processor, the values assigned to the located demographic characteristics to generate the score, wherein the demographic data comprises one or more of the following:

residence address data;
age data;
household data;
marital status data;
delinquent data for consumers in a geographic area; and
data related to length of residency.

* * * * *